US006369474B1

(12) United States Patent
Tanaka et al.

(10) Patent No.: US 6,369,474 B1
(45) Date of Patent: Apr. 9, 2002

(54) ALTERNATING CURRENT GENERATOR FOR VEHICLE

(75) Inventors: Kazunori Tanaka; Yoshihito Asao, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/635,471

(22) Filed: Aug. 11, 2000

(30) Foreign Application Priority Data

Feb. 10, 2000 (JP) .......................................... 12-033971

(51) Int. Cl.[7] .......................... H02K 11/00; H01R 4/02

(52) U.S. Cl. ............................ 310/71; 310/42; 29/860; 29/863

(58) Field of Search .......................... 29/854, 860, 861, 29/863; 310/71, 68 R, 42; 439/874; 219/56.22

(56) References Cited

U.S. PATENT DOCUMENTS 3,717,842 A * 2/1973 Douglas ..................... 29/860
3,739,323 A * 6/1973 Spors .......................... 310/71
4,913,678 A * 4/1990 Avellino et al. ............ 439/879
4,949,454 A * 8/1990 Schauer et al. ................ 29/860
5,739,496 A * 4/1998 Asakura et al. .......... 219/56.22
5,762,526 A * 6/1998 Kuramoto et al. .......... 439/877
5,808,260 A * 9/1998 Asakura et al. .......... 219/56.22

FOREIGN PATENT DOCUMENTS

JP 4-168952 6/1992 ............ H02K/9/06

* cited by examiner

*Primary Examiner*—Burton S. Mullins

(57) ABSTRACT

The generator comprises a polyphase stator coil 5 having a lead conductor 19 wound and inserted into a stator core 4, a rotor 6 having rotor cores 8 and 9 for forming magnetic poles, a front bracket 1 and a rear bracket 2 for holding a stator 3 and rotatably supporting the rotor 6, and a commutator 17 which is mounted in this rear bracket 2 and to which a metal terminal 20 bonded to the lead conductor 19 of the stator coil 5 is connected, and it is configured so that bonding between the lead conductor 19 and the metal terminal 20 is fixed by caulking with bonding pieces 20*a* and 20*b* provided in the metal terminal 20 embracing the end of the lead conductor 19 from both sides and spacing between the bonding pieces 20*a* and 20*b* embracing from both of these sides is bonded and fixed by arc welding.

8 Claims, 7 Drawing Sheets

ALTERNATING CURRENT GENERATOR FOR VEHICLE

BACKGROUND OF THE INVENTION

This invention relates to an alternating current generator used with the generator mounted in a vehicle and particularly, terminal treatment of a lead conductor of a stator coil.

Typically, a three-phase alternating current generator having a rotor of launder type is used in a generator mounted in a vehicle. In such an alternating current generator, whose configuration is disclosed in, for example, the Unexamined Japanese Patent Application Publication No. Hei 4-168952, a three-phase stator coil is wound and inserted into a stator core in the stator side, and the stator coil has a lead conductor, and a metal terminal is mounted in the end of the lead conductor and is connected and fixed in a commutator of three-phase full wave type provided in a bracket. A copper wire having a high heat-resistant insulating film such as a polyamide-imide electric wire is used as the stator coil and the lead conductor is provided so that this copper wire (single core copper wire) extends from the stator coil. The metal terminal formed of copper group metals is bonded to the lead conductor by soldering, combination of caulking with soldering, or fusing, and is fixed in the commutator by screws.

The alternating current generator for vehicle is mounted in an engine frame within an engine room of a vehicle, and atmospheric temperature is high and applied vibration is also large. In particular, the temperature of the stator coil is increased to about 200° C. which is the heat-resistant limit of the high heat-resistant insulating film in addition to the high atmospheric temperature at heavy load, and when the soldering described above is used in bonding between the lead conductor of the stator coil and the metal terminal, heat deterioration develops and the increase in bonding resistance of a bonded portion may result in breaking of wire. Because of this, a high-temperature solder with high Pb (lead) content must be used, but there were problems that the high-temperature solder with high Pb content causes deterioration of working atmosphere and reliability is reduced due to very bad workability.

Also, bonding by the fusing has the disadvantages that a form of the bonded portion is not stable and fatigue fracture due to vibration during use tends to occur since the bonding is fused by applying pressure, and both strength and electrical conduction became unstable in case that the bonded portion is dependent on caulking. Further, it was contemplated that the copper wire of the lead conductor is welded to the metal terminal as an alternative to these bonding methods. But in this case, while hardening or crack of the copper wire due to weld temperature occurs, intergranular crack is caused by occurrence of water vapor associated with reduction of oxides included in the metal terminal or the lead conductor and blowholes occur within a molten conductor, with the result that a decrease in resistance to vibration or an increase in electrical resistance of the bonded portion was caused and reliability was greatly influenced.

SUMMARY OF THE INVENTION

The invention is implemented to solve such problems, and it is an object of the invention to obtain an alternating current generator for vehicle with high reliability in which a bonded portion of the end of a lead conductor of a stator coil does not deteriorate to temperature or vibration.

An alternating current generator for vehicle according to the invention comprises a stator including a stator core and a polyphase stator coil having a lead conductor wound and inserted into this stator core, a rotor in which rotor cores for forming magnetic poles are fixed in a rotating shaft, a front bracket and a rear bracket for holding the stator and rotatably supporting the rotor, and a commutator which is mounted in this rear bracket and to which a metal terminal bonded to the lead conductor of the stator coil is connected, and it is configured so that bonding between the lead conductor and the metal terminal is fixed by caulking with bonding pieces provided in the metal terminal embracing the end of the lead conductor from both sides and spacing between the bonding pieces embracing from both of these sides is bonded and fixed by arc welding.

Also, it is configured so that fixation by welding of the spacing between the bonding pieces is performed in a part of the longitudinal direction of the spacing between the bonding pieces. Further, it is configured so that fixation by welding of the spacing between the bonding pieces is welded including a part of the lead conductor. Furthermore, it is configured so that a notch as the lead conductor is partially exposed in a state fixed by caulking is provided in the tip side of the lead conductor of the bonding pieces and spacing between the bonding pieces is welded and fixed in the vicinity of this notch.

Also, an applied pressure at the time of caulking is set so that a residual rate of a sectional area of the lead conductor becomes 70 to 80% in the fixation by caulking of the lead conductor by the bonding pieces. Further, it is configured so that oxygen free copper is used in at least one of the lead conductor and the metal terminal. Furthermore, it is configured so that the metal terminal is formed of a material with a hardness higher than that of the lead conductor. Also, it is configured so that solder coating is applied to a bonded portion by welding. Further, it is configured so that the lead conductor swaged and fixed by the bonding pieces of the metal terminal consists of a plurality of lead conductors.

DETAILED DESCRIPTION OF THE PREFERRED EMBODIMENTS (First Embodiment)

Figure 1:
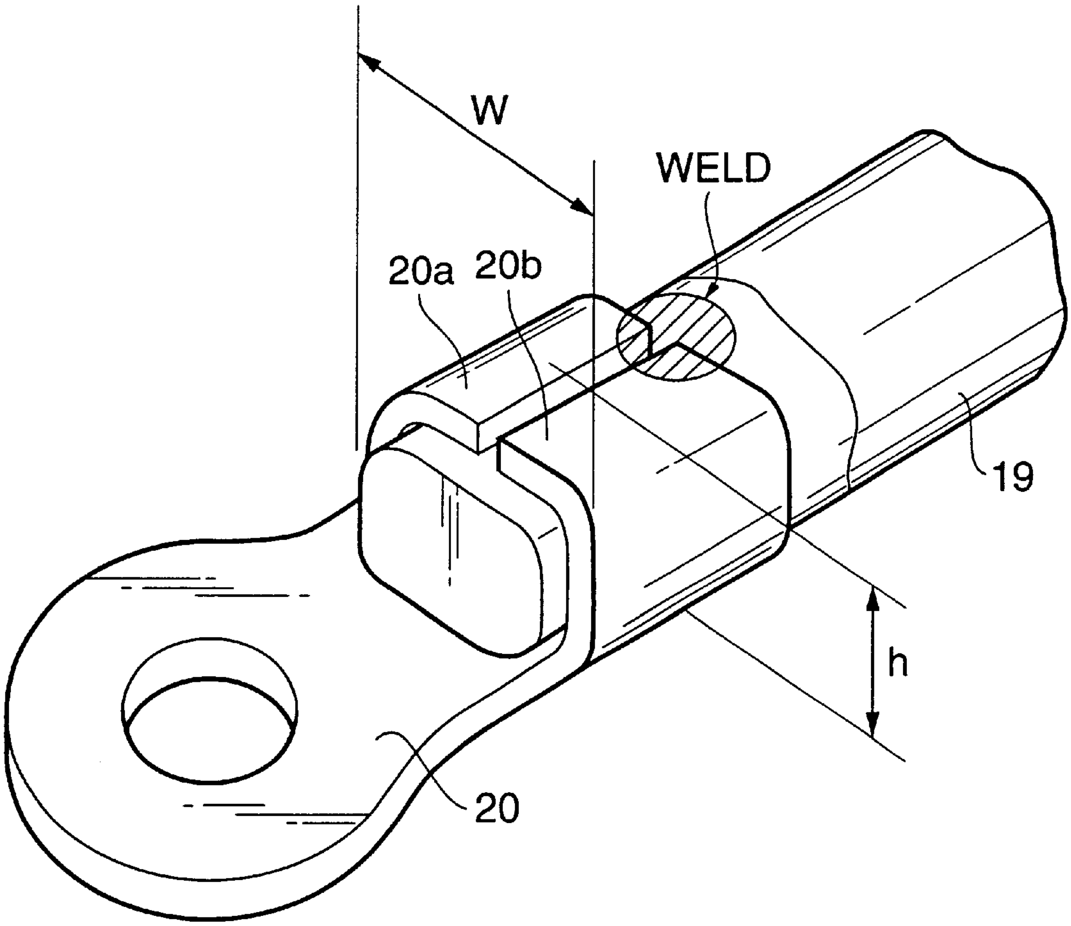
FIG. 1 is a perspective view showing a terminal treatment portion of a lead conductor of an alternating current generator for vehicle of a first embodiment according to this invention.
Figure 2:
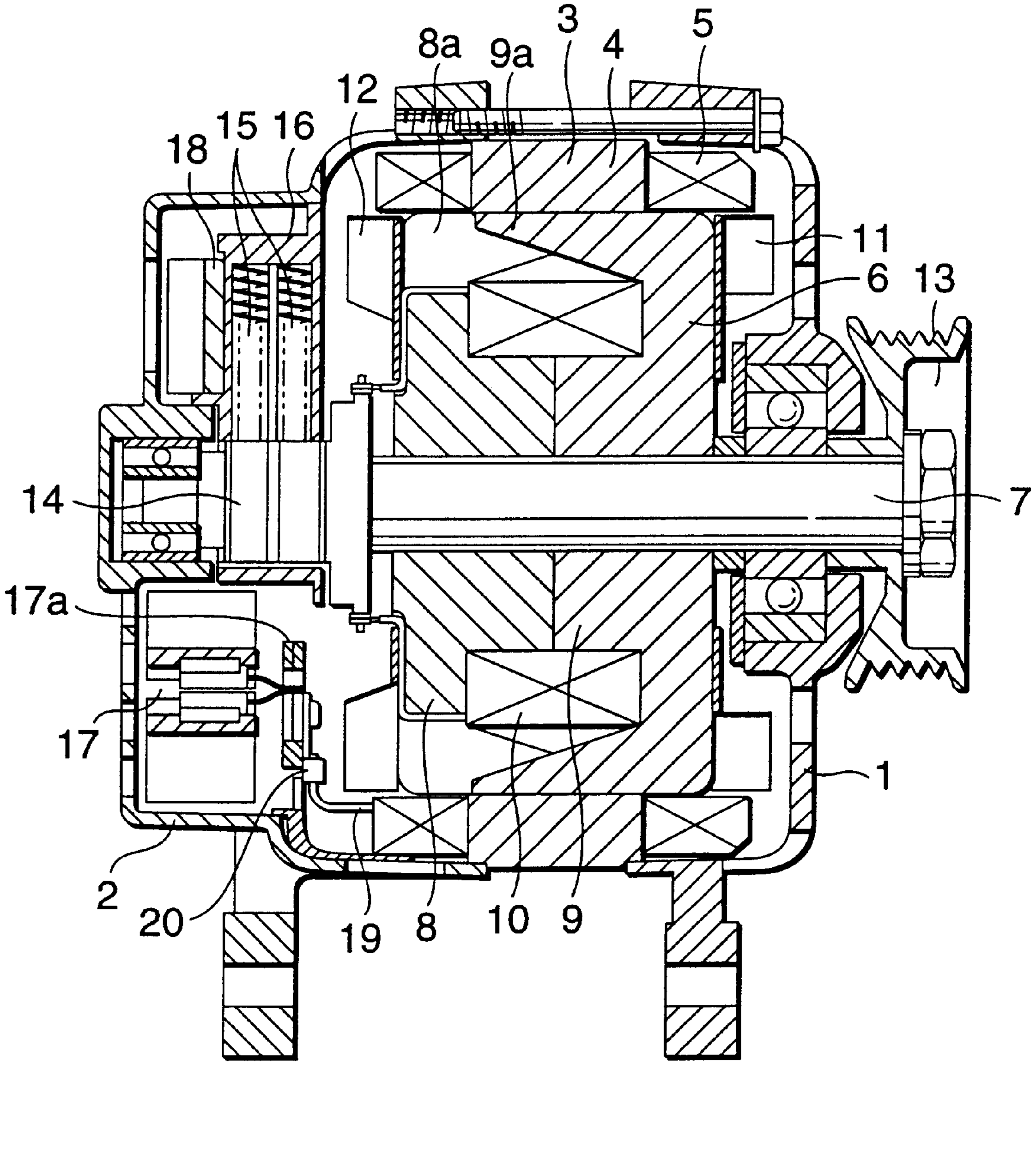
FIG. 2 is a sectional view showing the whole configuration of the alternating current generator for vehicle of the first embodiment according to the invention.
Figure 3:
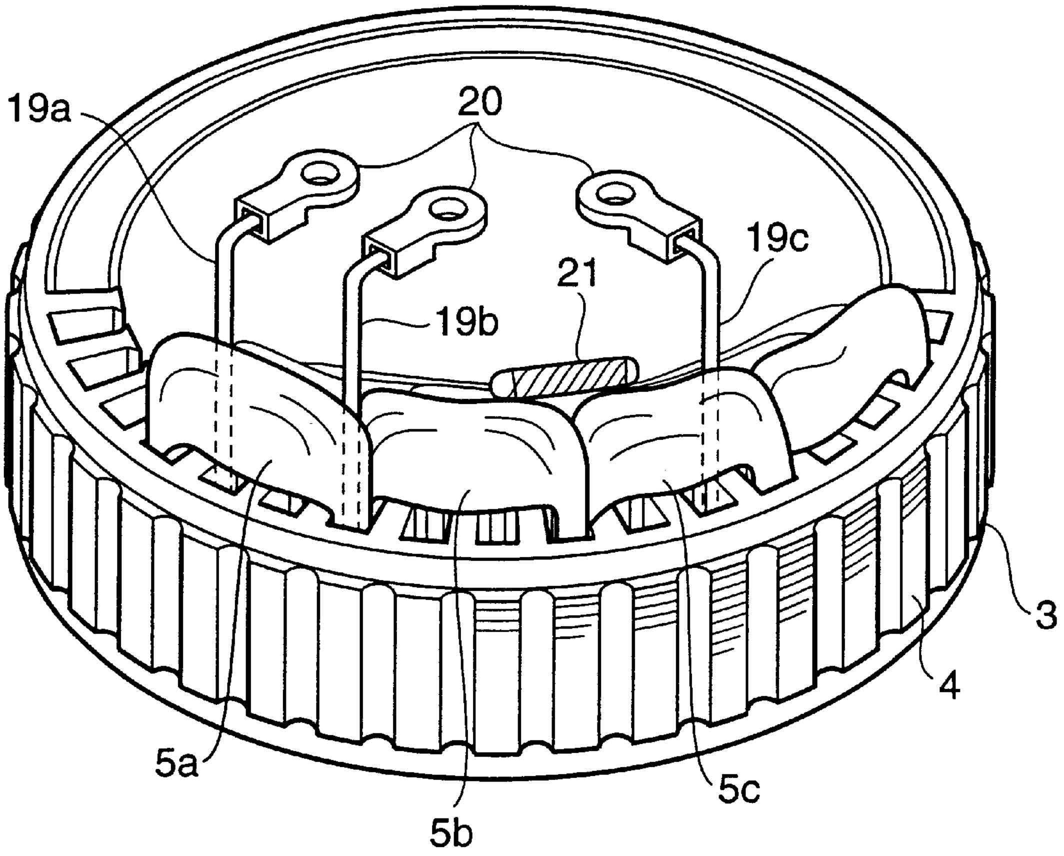
FIG. 3 is a perspective view showing a configuration of a stator of the alternating current generator for vehicle of the first embodiment according to the invention.
Figure 4:
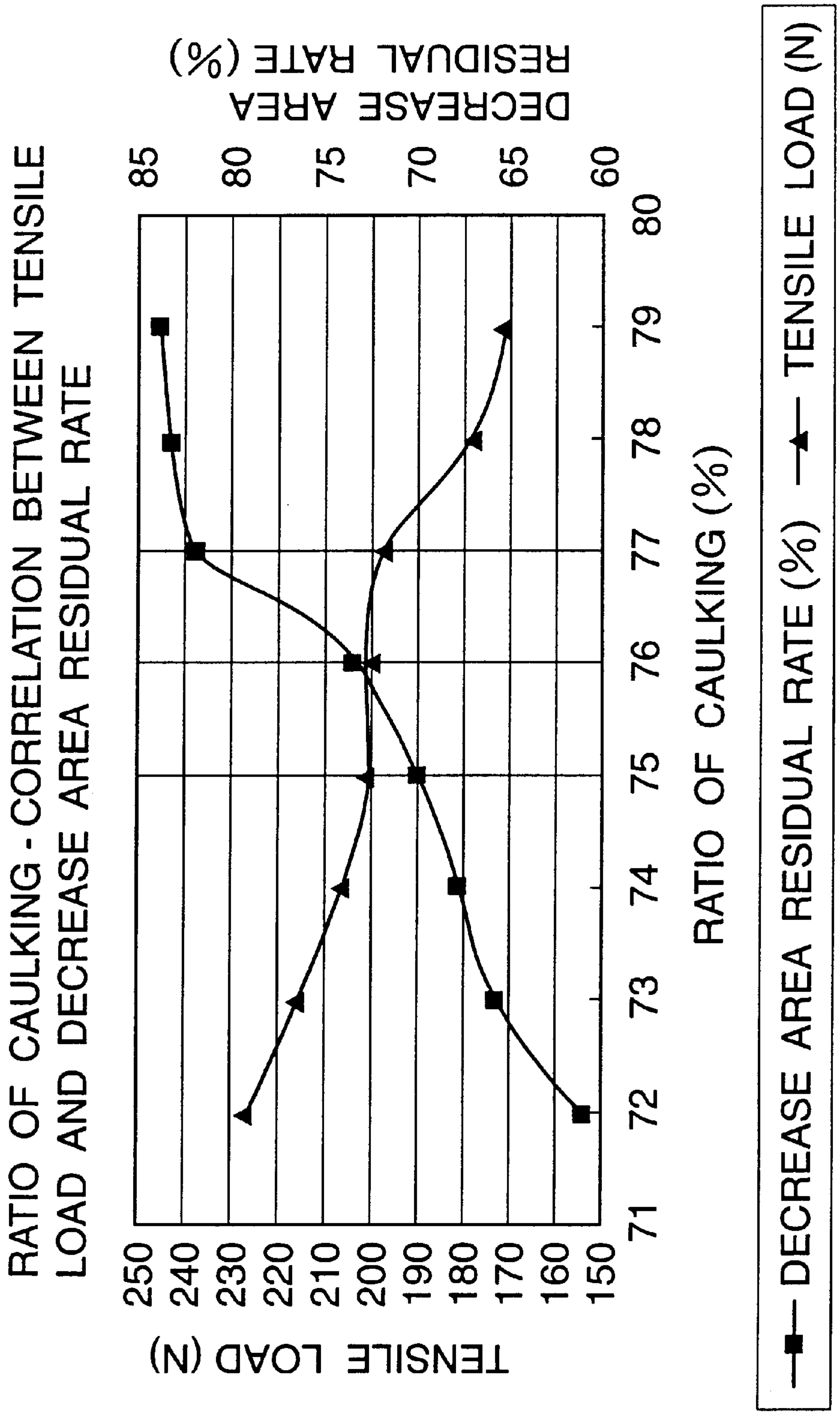
FIG. 4 is a graph illustrating strength of terminal treatment of the lead conductor of the alternating current generator for vehicle of the first embodiment according to the invention.
Figure 5:
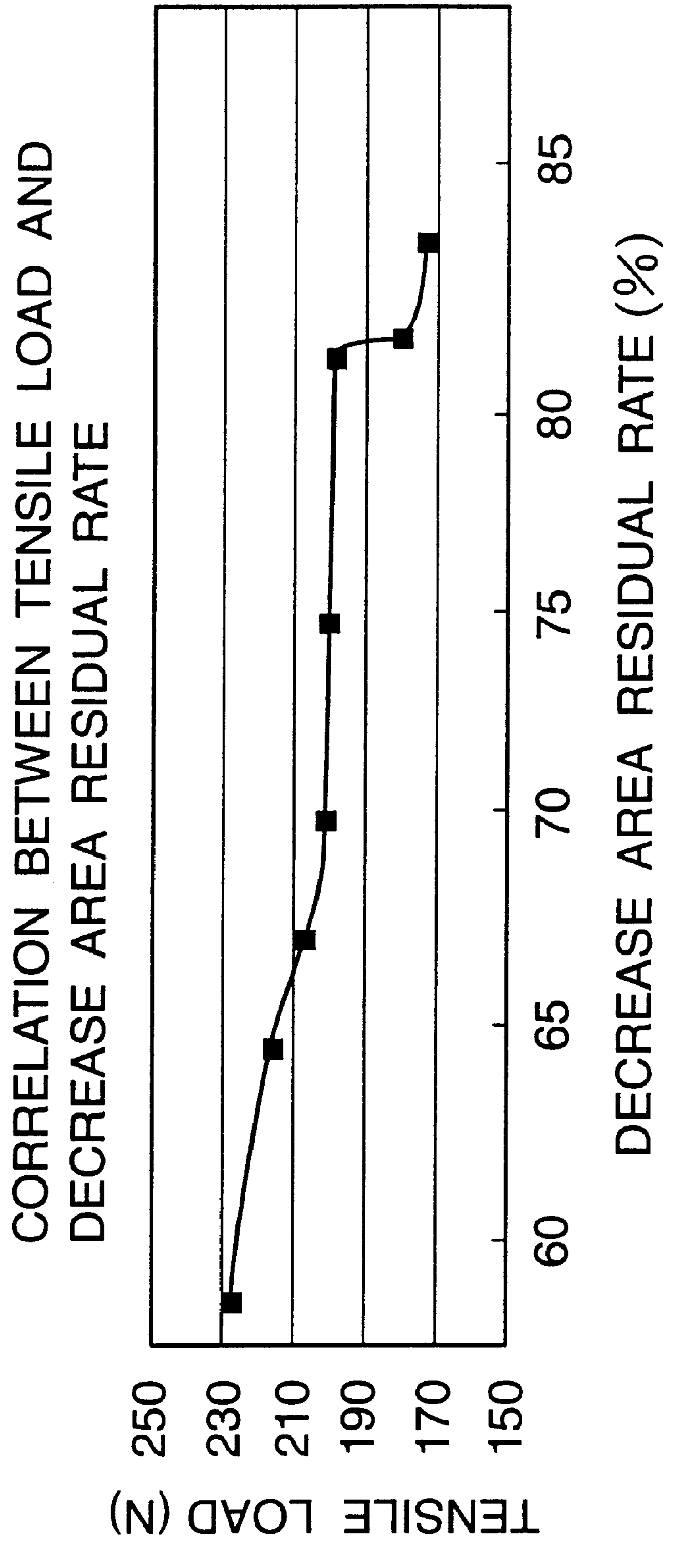
FIG. 5 is a graph illustrating strength of terminal treatment of the lead conductor of the alternating current generator for vehicle of the first embodiment according to the invention.

FIGS. 1 to 5 illustrate an alternating current generator for vehicle of a first embodiment according to this invention, and FIG. 1 is a perspective view of a terminal treatment portion of a lead conductor of a stator coil, and FIG. 2 is a sectional view showing the whole configuration of the generator, and FIG. 3 is a perspective view showing a configuration of a stator, and FIGS. 4 and 5 are graphs illustrating strength of terminal treatment of the lead conductor of the stator coil. In FIG. 2, numeral 1 is a front bracket, and numeral 2 is a rear bracket, and numeral 3 is a stator sandwiched between the front bracket 1 and the rear bracket 2 and the stator comprises a stator core 4 and a stator coil 5. Numeral 6 is a rotor comprising a rotating shaft 7 whose both ends are supported by the front bracket 1 and the rear bracket 2, rotor cores 8 and 9 mounted on this rotating shaft 7, a field coil 10 wound between both of the rotor cores 8 and 9, fans 11 and 12 provided in the back of both of the rotor cores 8 and 9, a pulley 13 provided in the rotating shaft 7, and a slip ring 14 provided in the rotating shaft 7 for supplying a current to the field coil 10.

Numeral 15 is a brush for supplying a current to the slip ring 14, and numeral 16 is a brush holder for holding this brush 15, and numeral 17 is a commutator of three-phase full wave type for commutating alternating current output of the stator coil 5, and numeral 18 is a regulator for regulating a current of the field coil 10 to control an output voltage of the stator coil 5, and they are mounted in the rear bracket 2. The stator coil 5 wound and inserted into the stator core 4 comprises three-phase stator coils 5*a,* 5*b* and 5*c* as shown in FIG. 3, and respective one of lead conductors 19*a,* 19*b* and 19*c* of each the stator coil 5*a,* 5*b* and 5*c* extend toward the rear bracket 2 as shown in FIG. 2, and metal terminals 20 are bonded to the top ends of the lead conductors which are connected and fixed to a terminal 17*a* of the commutator 17. Also, FIG. 3 shows an example of a stator of star connection, and the others of the lead conductors of each the stator coil 5*a,* 5*b* and 5*c* are connected all together to form a neutral point 21.

In the alternating current generator for vehicle formed in this manner, the rotor cores 8 and 9 have magnetic pole pieces 8*a* and 9*a* which are opposite to the inner diameter portion of the stator core 4 through a predetermined air gap and are arranged so as to have engagement alternately and are magnetized in different magnetic poles alternately by the field coil 10. The field coil 10 is excited from a battery (not shown) through the brush 15 and the slip ring 14, and the rotor 6 is driven by an engine and thereby a rotating magnetic field occurs, and a three-phase alternating current power is generated in the stator coils 5*a,* 5*b* and 5*c,* and direct current is obtained by the commutator 17 to charge the battery, and a power is supplied to a load (not shown).

A bond state between the metal terminals 20 and the lead conductors 19*a,* 19*b,* 19*c* of the stator coils 5*a,* 5*b,* 5*c* placed on this power supply path is shown in FIG. 1. An insulating film of the top end is removed in the lead conductor 19 and the lead conductor 19 is fixed by caulking with the lead conductor 19 embraced by bonding pieces 20*a* and 20*b* of the metal terminal 20 from both sides and moreover, in one end of portions where both of the bonding pieces 20*a* and 20*b* are opposite or overlap, spacing between the bonding pieces 20*a* and 20*b* is bonded and fixed by arc welding such as TIG welding and simultaneously a part of the lead conductor 19 is welded. The caulking pressure in this case is set so that a sectional area of the lead conductor 19 becomes 70 to 80% of the initial value, and this caulking pressure can be accurately set by controlling the ratio of caulking, namely a height from the bottom of the metal terminal 20 to the top of a swaged portion and a width of the swaged portion as shown in the height h and the width W of FIG. 1.

FIG. 4 is a characteristic graph illustrating the relationship between a decrease area residual rate showing a change in sectional area of the lead conductor 19 by a residual rate and tensile strength of a bonded portion of the lead conductor 19 and the metal terminal 20 to this ratio of caulking. Also, FIG. 5 is a characteristic graph illustrating the relationship between the decrease area residual rate and the tensile strength shown in FIG. 4. While bond strength increases with a decrease in the ratio of caulking, namely the height h from the bottom of the metal terminal 20 to the top of the swaged portion, the decrease area residual rate greatly decreases, with the result that stress caused by vibration concentrates on a change portion of the sectional area and fatigue fracture tends to occur. As shown in FIG. 5, for the decrease area residual rate in the range of 70 to 80%, the tensile strength of the bonded portion does not change and is stable and also control is easy and a decrease rate in the sectional area is low, with the result that sufficient tensile strength and resistance to fatigue fracture can be obtained.

As described above, in the alternating current generator for vehicle of the first embodiment of the invention, bonding between the lead conductor 19 and the metal terminal 20 for connecting the stator coil 5 to the commutator 17 is first performed by caulking of the metal terminal 20 so that a residual rate of a sectional area of the lead conductor 19 becomes 70 to 80% of the initial value in the swaged portion and further, spacing between the bonding pieces 20*a* and 20*b* is welded and fixed at one end including a part of the lead conductor 19, so that the bonding having sufficient tensile strength without occurrence of fatigue fracture can be performed and also deterioration of this bond strength with time is suppressed by the welding fixation and electrical conductivity can be also stable to obtain the bonded portion with high reliability. Further, when oxygen free copper is used in the lead conductor 19 and/or the metal terminal 20, stable welding in which occurrence of blowholes caused by welding is suppressed can be obtained and also, since welding is performed in only one end of an opposite portion of the bonding pieces 20*a* and 20*b,* deterioration by welding heat of the bonded portion can also be reduced to a minimum.

(Second Embodiment)

Figure 6:
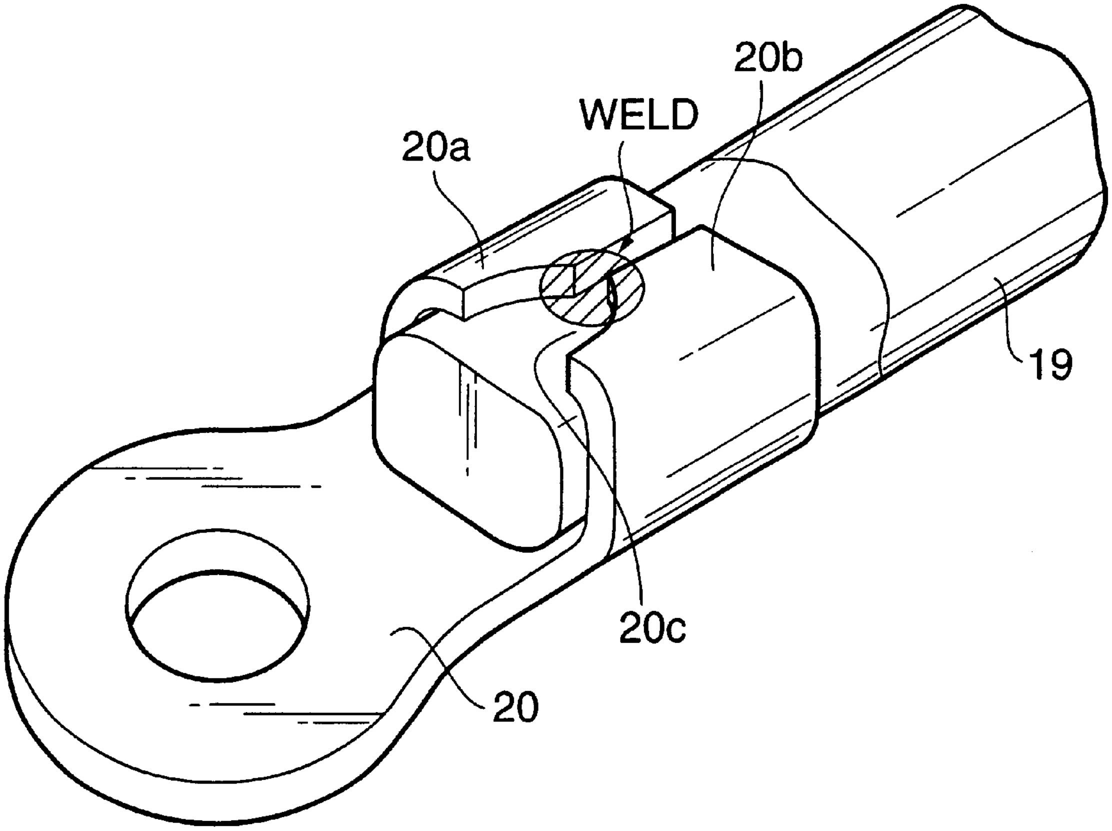
FIG. 6 is a perspective view showing a terminal treatment portion of a lead conductor of an alternating current generator for vehicle of a second embodiment according to the invention.

FIG. 6 is a perspective view showing terminal treatment of a lead conductor of a stator coil of an alternating current generator for vehicle of a second embodiment according to the invention. In this embodiment where a lead conductor 19 of a stator coil 5 is swaged and fixed by bonding pieces 20*a* and 20*b* of a metal terminal 20 and moreover spacing between the bonding pieces 20*a* and 20*b* is fixed by arc welding such as TIG welding, a notch portion 20*c* is provided in the tip side of the lead conductor 19 of the bonding pieces 20*a* and 20*b* so as to be formed in a U-shape in a caulking state, and the spacing between the bonding pieces 20*a* and 20*b* is welded and fixed in the vicinity of this U-shaped notch portion 20*c* and simultaneously a part of the lead conductor 19 is welded inside the U-shaped notch portion 20*c*.

During use of the generator, bending stress is repeatedly applied to the lead conductor 19 of the stator coil 5 due to vibration transmitted from an engine, and a portion to which the strongest bending stress is applied is the boundary where the lead conductor 19 is bonded and fixed to the metal terminal 20. In this embodiment, since the lead conductor 19 is held with the lead conductor 19 embraced by the bonding pieces 20*a* and 20*b* at the boundary where the lead conductor 19 is bonded to the metal terminal 20, stress due to vibration is likely to be displaced and absorbed and a portion where the lead conductor 19 is likely to harden by welding heat is the tip side of the lead conductor 19, so that resistance to vibration higher than that of the first embodiment can be obtained while obtaining strength and electrical conductivity similar to that of the first embodiment. Also, since a portion to which heat by welding is applied is only the tip end of the lead conductor 19, an insulating film of the lead conductor 19 does not deteriorate by heat and corrosion-resistant deterioration can be prevented and also, the U-shaped notch portion 20*c* acts as a molten pool of welding and electrical bonding between the metal terminal 20 and the lead conductor 19 is ensured more.

(Third Embodiment)

Figure 7:
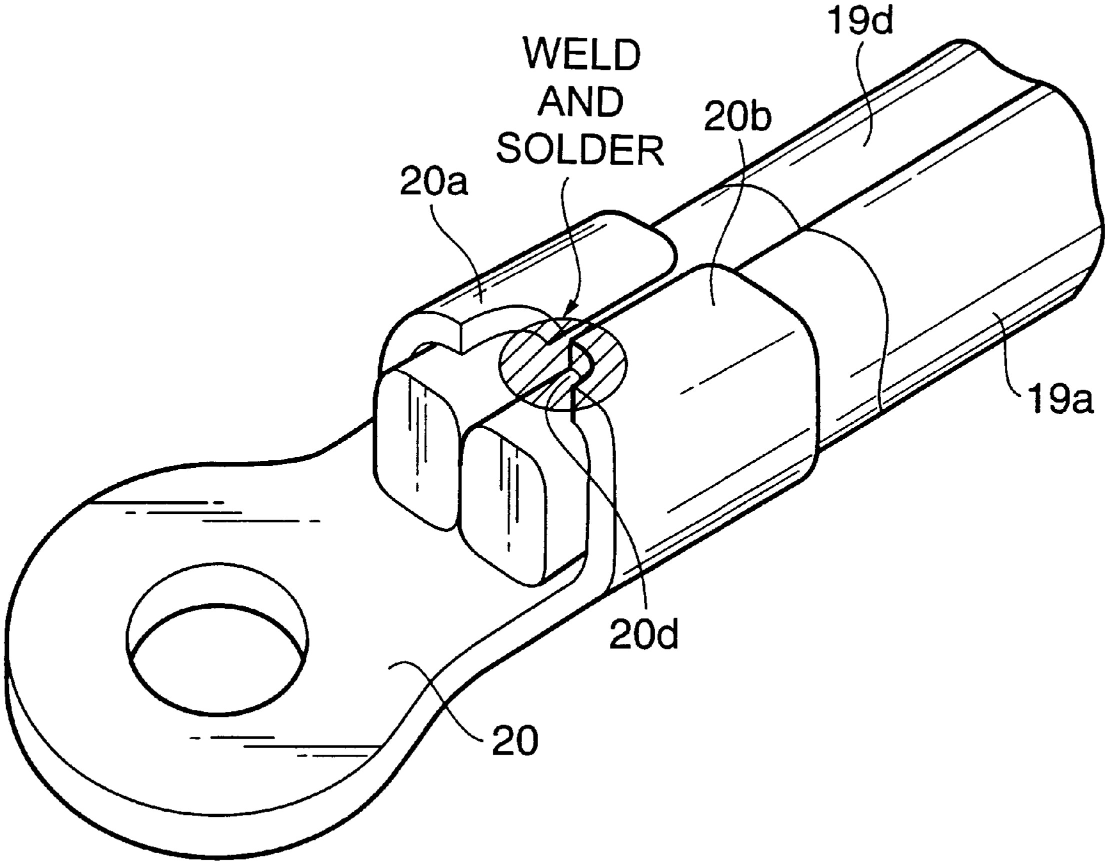
FIG. 7 is a perspective view showing a terminal treatment portion of a lead conductor of an alternating current generator for vehicle of a third embodiment according to the invention.

FIG. 7 is a perspective view showing terminal treatment of a lead conductor of a stator coil of an alternating current generator for vehicle of a third embodiment according to the invention. The case of a stator coil 5 with star connection is shown in the first and second embodiments, but in this embodiment, an example of delta connection is shown and two lead conductors 19*a* and 19*d* are connected to a metal terminal 20. In this connection, each of the lead conductors 19*a* and 19*d* are fixed by caulking so as to be embraced respectively by bonding pieces 20*a* and 20*b* of the metal terminal 20. A V-shaped notch portion 20*d* is provided in the bonding pieces 20*a* and 20*b* of the metal terminal 20 at the same place as the case of the second embodiment, and the metal terminal 20 is formed of a material (such as brass with relatively high hardness among copper group metals) with a hardness higher than that of the lead conductors and also, spacing between the bonding pieces 20*a* and 20*b* is welded in the vicinity of this V-shaped notch portion 20*d* and simultaneously a part of both the lead conductors 19*a* and 19*d* is welded inside the V-shaped notch portion 20*d,* and solder coating is applied to a welded portion after welding.

In the case of connecting the two lead conductors 19*a* and 19*d* to the metal terminal 20 thus, stable strength and electrical conductivity can be obtained by controlling a decrease area residual rate in the range of 70 to 80% in a manner similar to the first embodiment described above. Also, by forming the metal terminal 20 of brass with a hardness higher than that of the lead conductors 19*a* and 19*d* and applying solder coating to the welded portion after welding, stable caulking strength, good electrical conductivity and high corrosion resistance can simultaneously be obtained and bonding with higher reliability can be performed. Particularly, in the case of connecting the two lead conductors 19*a* and 19*d* to the metal terminal 20 as described in this embodiment, each of the conductors 19*a* and 19*d* is individually swaged and fixed by the bonding pieces 20*a* and 20*b,* so that higher strength can be obtained.

Incidentally, in the above description, the example of delta connection is shown in this embodiment, but even for star connection, in the case of two winding for overlapping and winding two stator coils, two lead conductors are used and similar effect can be obtained by similar caulking fixation, and such a manner can be applied even to the case of three or more winding. Also, it goes without saying that similar effect can be obtained by the V-shaped notch portion 20*d,* the material of the metal terminal 20 and the solder coating after welding even in the case that the lead conductor 19 is single wire as the first and second embodiments described above. Further, by concurrently using the caulking fixation and welding according to the invention for connection of the neutral point 21 of the star connection shown in FIG. 3, high bond strength can be obtained.

According to an alternating current generator for vehicle of the invention as described above, bonding between a lead conductor and a metal terminal for connecting a stator coil to a commutator is performed by caulking while controlling a height and a width so that a sectional area of the lead conductor becomes 70 to 80% of the initial value in a swaged portion and a part of this swaged portion and a part of the lead conductor are fixed by welding, and also a U-shaped or V-shaped notch portion is provided in the tip side of the lead conductor of the swaged portion and in the vicinity of the notch portion and inside the notch portion, a part of the swaged portion and a part of the lead conductor are fixed by welding, and further oxygen free copper is used in the lead conductor and/or the metal terminal or a material with a hardness higher than that of the lead conductor is used in the metal terminal or the solder coating is applied to a welded portion, with the result that the alternating current generator for vehicle in which the bonding without occurrence of fatigue fracture in a stable state of tensile strength can be performed and there is no deterioration of this bond strength or electrical conductivity with time and a bonded portion with good resistance to corrosion and vibration and high reliability is included can be obtained.

What is claimed is:

1. An alternating current generator for a vehicle, comprising:

a stator including a stator core and a polyphase stator coil having a lead conductor wound and inserted into said stator core, a rotor in which rotor cores for forming magnetic poles are fixed in a rotating shaft, a front bracket and a rear bracket for holding said stator and rotatably supporting said rotor, and a commutator which is mounted in said rear bracket and to which a metal terminal bonded to said lead conductor of said stator coil is connected, wherein said lead conductor and said metal terminal are bonded together by caulking with bonding pieces provided in said metal terminal embracing an end portion of said lead conductor from opposite sides and welding said bonding pieces of said metal terminal at a spacing gap between said bonding pieces, said bonding pieces of said metal terminal form a notch at an end portion of the spacing gap between said bonding pieces, and said bonding pieces of said metal terminal are welded at the spacing gap between said bonding pieces in the vicinity of the notch.

2. The alternating current generator for a vehicle as defined in claim 1, wherein said bonding pieces of said metal terminal are welded at an end portion, in the longitudinal direction, of the spacing gap between said bonding pieces.

3. The alternating current generator for a vehicle as defined in claim 1, wherein said welding of said bonding pieces of said metal terminal at the spacing gap between said bonding pieces includes welding said end portion of said lead conductor.

4. The alternating current generator for a vehicle as defined in claim 1, wherein said stator includes a plurality of poly-phase stator coils each having a lead conductor.

5. An alternating current generator for a vehicle, comprising:

a stator including a stator core and a polyphase stator coil having a lead conductor wound and inserted into said stator core, a rotor in which rotor cores for forming magnetic poles are fixed in a rotating shaft, a front bracket and a rear bracket for holding said stator and rotatably supporting said rotor, and a commutator which is mounted in said rear bracket and to which a metal terminal bonded to said lead conductor of said stator coil is connected, wherein said lead conductor and said metal terminal are bonded together by caulking with bonding pieces provided in said metal terminal embracing an end portion of said lead conductor from opposite sides and welding said bonding pieces of said metal terminal at a spacing gap between said bonding pieces, wherein an applied pressure of caulking is set so that a sectional area of said lead conductor after caulking is 70 to 80% of the sectional area said lead conductor prior to caulking.

6. An alternating current generator for a vehicle, comprising:

a stator including a stator core and a polyphase stator coil having a lead conductor wound and inserted into said stator core, a rotor in which rotor cores for forming magnetic poles are fixed in a rotating shaft, a front bracket and a rear bracket for holding said stator and rotatably supporting said rotor, and a commutator which is mounted in said rear bracket and to which a metal terminal bonded to said lead conductor of said stator coil is connected, wherein said lead conductor and said metal terminal are bonded together by caulking with bonding pieces provided in said metal terminal embracing an end portion of said lead conductor from opposite sides and welding said bonding pieces of said metal terminal at a spacing gap between said bonding pieces, wherein at least one of said lead conductor and said metal terminal is formed of a material comprising oxygen free copper.

7. An alternating current generator for a vehicle, comprising:

a stator including a stator core and a polyphase stator coil having a lead conductor wound and inserted into said stator core, a rotor in which rotor cores for forming magnetic poles are fixed in a rotating shaft, a front bracket and a rear bracket for holding said stator and rotatably supporting said rotor, and a commutator which is mounted in said rear bracket and to which a metal terminal bonded to said lead conductor of said stator coil is connected, wherein said lead conductor and said metal terminal are bonded together by caulking with bonding pieces provided in said metal terminal embracing an end portion of said lead conductor from opposite sides and welding said bonding pieces of said metal terminal at a spacing gap between said bonding pieces, wherein said metal terminal is formed of a material having a hardness which is greater than a hardness of said lead conductor.

8. An alternating current generator for a vehicle, comprising:

a stator including a stator core and a polyphase stator coil having a lead conductor wound and inserted into said stator core, a rotor in which rotor cores for forming magnetic poles are fixed in a rotating shaft, a front bracket and a rear bracket for holding said stator and rotatably supporting said rotor, and a commutator which is mounted in said rear bracket and to which a metal terminal bonded to said lead conductor of said stator coil is connected, wherein said lead conductor and said metal terminal are bonded together by caulking with bonding pieces provided in said metal terminal embracing an end portion of said lead conductor from opposite sides and welding said bonding pieces of said metal terminal at a spacing gap between said bonding pieces, wherein a solder coating is applied to a welded portion of said bonding pieces after welding.

* * * * *